United States Patent
Nichols et al.

(10) Patent No.: US 8,170,729 B2
(45) Date of Patent: May 1, 2012

(54) METHOD AND SYSTEM FOR OPERATING A DISPLAY DEVICE ON-BOARD AN AIRCRAFT

(75) Inventors: Troy Nichols, Peoria, AZ (US); Mike Little, Peoria, AZ (US); Xavier Henry, Glendale, AZ (US); Ivan Sandy Wyatt, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 936 days.

(21) Appl. No.: 12/188,831

(22) Filed: Aug. 8, 2008

(65) Prior Publication Data

US 2010/0036548 A1     Feb. 11, 2010

(51) Int. Cl.
*G06F 7/00* (2006.01)
(52) U.S. Cl. ........................................ 701/4
(58) Field of Classification Search .............. 701/3–4; 434/43, 45–47; 340/945, 973–980
See application file for complete search history.

(56) References Cited

U.S. PATENT DOCUMENTS

| | | | | |
|---|---|---|---|---|
| 4,263,726 A * | 4/1981 | Bolton | | 434/43 |
| 5,978,715 A * | 11/1999 | Briffe et al. | | 701/11 |
| 7,219,011 B1 * | 5/2007 | Barber | | 701/205 |
| 7,629,986 B2 * | 12/2009 | Bobrow et al. | | 345/629 |
| 7,693,621 B1 * | 4/2010 | Chamas | | 701/16 |

* cited by examiner

*Primary Examiner* — Yonel Beaulieu
(74) *Attorney, Agent, or Firm* — Ingrassia Fisher & Lorenz, P.C.

(57) ABSTRACT

Methods and systems for operating a display device that is viewable by a user of an aircraft are provided. A first image is caused to be displayed on the display device. The first image is at least representative of a field of view from on-board the aircraft of an actual terrain. A second image is rendered over the first image on the display device. The second image includes a vertical position indicator indicating a vertical position of the aircraft relative to a selected flight path. The vertical position indicator is moved in a pitch direction on the display device in response to the aircraft moving relative to the actual terrain. The pitch direction corresponds to a change in the pitch of the aircraft.

20 Claims, 8 Drawing Sheets

METHOD AND SYSTEM FOR OPERATING A DISPLAY DEVICE ON-BOARD AN AIRCRAFT

TECHNICAL FIELD

The present invention generally relates to display devices on-board aircraft, and more particularly relates to methods and systems for operating a display device that is viewable by a user of an aircraft.

BACKGROUND

Modern vehicles, such as aircraft, often include various displays for simultaneously displaying several types of information to a user (e.g., the pilot). Primary flight displays (PFD) and head-up displays (HUDs) often project various symbols and information over an image of the environment outside the aircraft. More specifically, primary flight displays typically make use of an artificial image of the environment (e.g., a digital terrain) while HUDs include a transparent display, or image combiner, through which the pilot may view the exterior. In modern implementations of both, various "symbology" is rendered over the image of the exterior of the aircraft to indicate various operational conditions to the user.

One of the symbols often indicates the vertical position of the aircraft relative to a desired flight path, or flight plan, and is sometimes referred to as a Vertical Deviation Indicator (VDev). Typically, the VDev is displayed on the display screen in a fixed position. This often results in the user needing to divert his or her view from another important symbol on the display, such as a Flight Path Reference (FPRef) line, in order to ascertain the aircraft's position relative to the desired flight path. However, in some implementations, the VDev moves across the display screen, both vertically and horizontally, in a fixed position relative to one of the other symbols, such as the FPRef. As a result, the VDev is sometimes obscured from view by other symbology, or vice versa.

Accordingly, it is desirable to provide a method and system for operating a display device on-board an aircraft in such a way as to facilitate the user's use of a vertical position indicator on the display, such as a VDev. Furthermore, other desirable features and characteristics of the present invention will become apparent from the subsequent detailed description of the invention and the appended claims, taken in conjunction with the accompanying drawings and this background of the invention.

BRIEF SUMMARY

A method for operating a display device that is viewable by a user of an aircraft is provided. A digital terrain image is generated on the display device. The digital terrain image is representative of an actual terrain. A symbology image is displayed over the digital terrain. The symbology image includes a vertical position indicator indicating a vertical position of the aircraft relative to a selected flight path. The vertical position indicator is moved in a pitch direction on the display device in response to the aircraft moving relative to the actual terrain. The pitch direction corresponds to a change in the pitch of the aircraft.

A method for operating a display device that is viewable by a user of an aircraft is provided. A first image is caused to be displayed on the display device. The first image is at least representative of a field of view from on-board the aircraft of an actual terrain. A second image is rendered over the first image on the display device. The second image includes a vertical position indicator indicating a vertical position of the aircraft relative to a selected flight path. The vertical position indicator is moved in a pitch direction on the display device in response to the aircraft moving relative to the actual terrain. The pitch direction corresponds to a change in the pitch of the aircraft. The vertical position indicator is restricted to movement in substantially the pitch direction on the display device.

An avionics system is provided. The avionics system includes a display device that is viewable by a user of an aircraft and a processor in operable communication with the display device. The processor is configured to display a digital terrain image on the display device, the digital terrain image being representative of an actual terrain, display a symbology image over the digital terrain, the symbology image comprising a vertical position indicator indicating a vertical position of the aircraft relative to a selected flight path to the user of the aircraft, and move the vertical position indicator on the display device in a pitch direction in response to the aircraft moving relative to the actual terrain, the pitch direction corresponding to a change in the pitch of the aircraft.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, and brief summary or the following detailed description. It should also be noted that FIGS. 1-8 are merely illustrative and may not be drawn to scale.

FIG. 1 to FIG. 8 illustrate methods and systems for operating a display device that is viewable by a user of an aircraft. In one embodiment, a digital terrain image is generated on the display device. The digital terrain image is representative of an actual terrain. A symbology image is displayed over the digital terrain. The symbology image includes a vertical position indicator indicating a vertical position of the aircraft relative to a selected flight path. The vertical position indicator is moved in a pitch direction on the display device in response to the aircraft moving relative to the actual terrain. The pitch direction corresponds to a change in the pitch of the aircraft.

In another embodiment, a first image is caused to be displayed on the display device. The first image is at least representative of a field of view from on-board the aircraft of an actual terrain. A second image is rendered over the first image on the display device. The second image includes a vertical position indicator indicating a vertical position of the aircraft relative to a selected flight path. The vertical position indicator is moved in a pitch direction on the display device in response to the aircraft moving relative to the actual terrain. The pitch direction corresponds to a change in the pitch of the aircraft. The vertical position indicator is restricted to movement in substantially the pitch direction on the display device.

Figure 1:
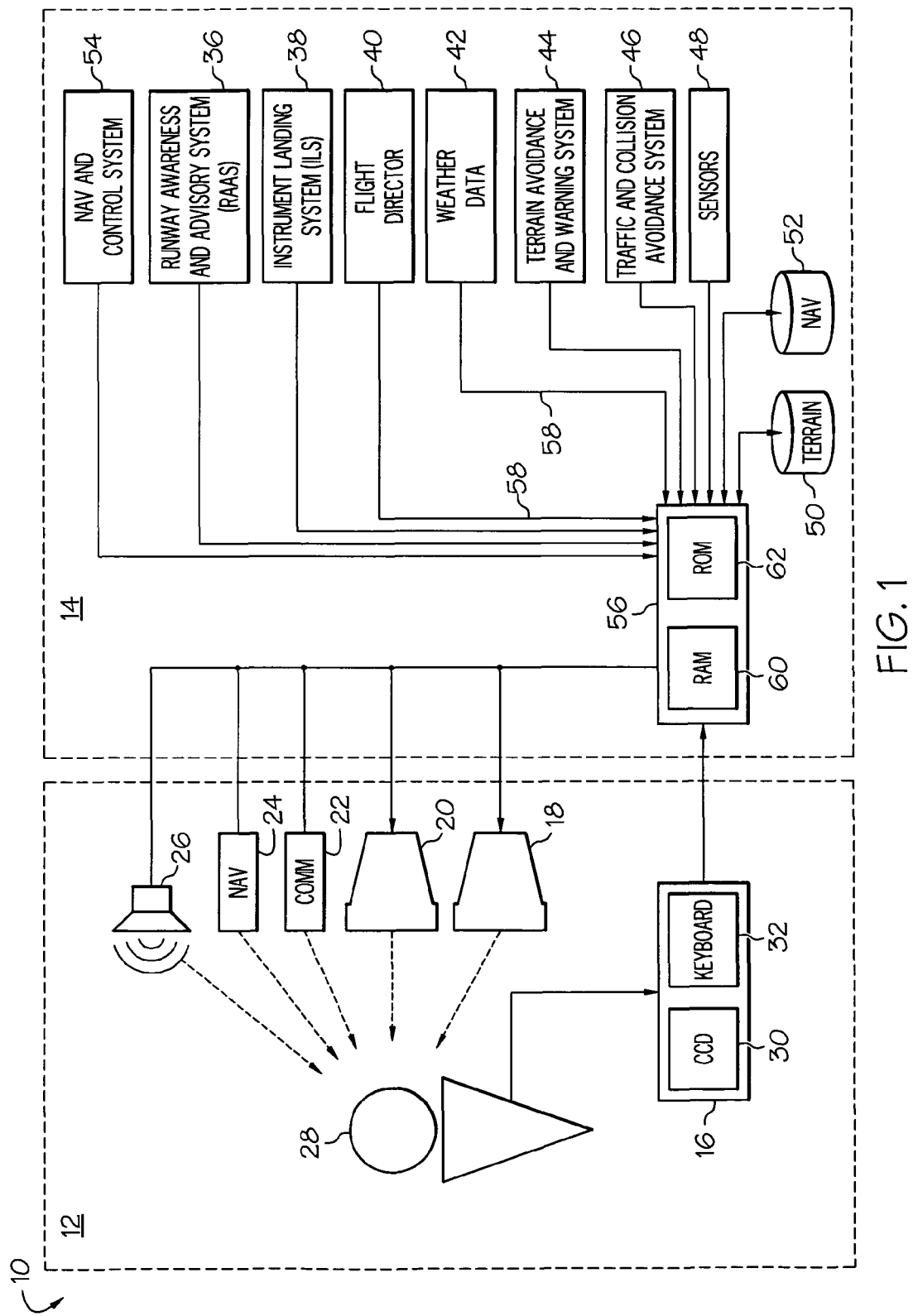
FIG. 1 is a schematic block diagram of an aircraft, according to one embodiment of the present invention.

FIG. 1 schematically illustrates a vehicle 10, such as an aircraft, according to one embodiment of the present invention. The aircraft 10 may be, in one embodiment, any one of a number of different types of aircraft such as, for example, a private propeller or jet engine driven airplane, a commercial jet liner, or a helicopter. In the depicted embodiment, the aircraft 10 includes a flight deck 12 (or cockpit) and an avionics/flight system 14. Although not specifically illustrated, it should be understood that the aircraft 10 also includes a frame or body to which the flight deck 12 and the avionics/flight system 14 are connected, as is commonly understood. It should also be noted that aircraft 10 is merely exemplary and could be implemented without one or more of the depicted components, systems, and data sources. It will additionally be appreciated that the aircraft 10 could be implemented with one or more additional components, systems, or data sources.

The flight deck 12 includes a user interface 16, display devices (or displays) 18 and 20, a communications radio 22, a navigational radio 24, and an audio device 26.

The user interface 16 is configured to receive input from a user 28 (e.g., a pilot) and, in response to user input, supply command signals to the avionics/flight system 14. The user interface 16 may include flight controls (not shown) and any one of, or combination of, various known user interface devices including, but not limited to, a cursor control device (CCD), such as a mouse, a trackball, or joystick, and/or a keyboard, one or more buttons, switches, or knobs. In the depicted embodiment, the user interface 16 includes a CCD 30 and a keyboard 32. The user 28 uses the CCD 30 to, for example, move a cursor symbol on the display devices 18 and 20, and uses the keyboard 32 to, for example, input textual data.

Still referring to FIG. 1, the display devices 18 and 20 are used to display various images and data, in graphic, iconic, and/or textual formats, and to supply visual feedback to the user 28 in response to the user input commands supplied by the user 28 to the user interface 16. The display devices 18 and 20 may each be implemented using any one of numerous known displays suitable for rendering image and/or text data in a format viewable by the user 28, such as a cathode ray tube (CRT) displays, a LCD (liquid crystal display), or a TFT (thin film transistor) displays. In one embodiment, display device 18 is a primary flight display (PFD). The display devices 18 and 20 may also be implemented on the flight deck 12 as "head-down" displays or head-up displays (HUD) projection on a fixed image combiners. Additionally, one or more of the display devices 18 and 20 may be implemented as a near-to-eye (NTE) display coupled to a headset (not shown) for the user 28.

The communication radio 22 is used, as is commonly understood, to communicate with entities outside the aircraft 10, such as air-traffic controllers and pilots of other aircraft. The navigational radio 24 is used to receive from outside sources and communicate to the user various types of information regarding the location of the vehicle, such as Global Positioning Satellite (GPS) system and Automatic Direction Finder (ADF) (as described below). The audio device 26 is, in one embodiment, an audio speaker mounted within the flight deck 12.

As shown in FIG. 1, the avionics/flight system 14 includes a runway awareness and advisory system (RAAS) 36, an instrument landing system (ILS) 38, a flight director 40, a weather data source 42, a terrain avoidance warning system (TAWS) 44, a traffic and collision avoidance system (TCAS) 46, a plurality of sensors 48 (e.g., a barometric pressure sensor, a thermometer, and a wind speed sensor), one or more terrain databases 50, one or more navigation databases 52, a navigation and control system (or navigation computer) 54, and a processor 56. The various components of the avionics/flight system 14 are in operable communication via a data bus (or avionics bus) 58. Although not illustrated, the navigation and control system 54 may include a flight management system (FMS), a control display unit (CDU), an autopilot or automated guidance system, multiple flight control surfaces (e.g., ailerons, elevators, and a rudder), an Air Data Computer (ADC), an altimeter, an Air Data System (ADS), a Global Positioning Satellite (GPS) system, an automatic direction finder (ADF), a compass, at least one engine, and gear (i.e., landing gear).

The processor 56 may be a general-purpose controller or an application specific processor that operate in response to program instructions, such as field programmable gate arrays (FPGAs), application specific integrated circuits (ASICs), discrete logic, microprocessors, microcontrollers, and digital signal processors (DSPs), or combinations thereof. In the depicted embodiment, the processor 74 includes on-board RAM (random access memory) 60 and on-board ROM (read only memory) 62. The program instructions that control the processor 56 may be stored in either or both the RAM 60 and the ROM 62. For example, the operating system software may be stored in the ROM 62, whereas various operating mode software routines and various operational parameters may be stored in the RAM 60. The RAM 60 and/or the ROM 62 may include instructions stored thereon for carrying out the methods and processes described below. It will be appreciated that this is merely exemplary of one scheme for storing operating system software and software routines, and that various other storage schemes may be implemented. It will also be appreciated that the processor 56 may be implemented using various other circuits, not just a programmable processor. For example, digital logic circuits and analog signal processing circuits could also be used.

During operation, the processor 56 receives various types of information about the position and orientation of the aircraft 10 from, for example, the GPS system, the ADF, the compass, the altimeter, the ADS, as well information about the terrain over which the aircraft 10 is flying from, for example, the terrain and navigational databases 50 and 52 to generate a perspective view of the terrain as seen from the aircraft (e.g., a field of view of the user 28 looking through a window or a windshield of the aircraft 10). In an embodiment in which the display device in question is a head-down display, the image generated includes a digital terrain image as described below. In an embodiment in which the display device is a HUD, the image of the terrain is simply the user's 28 field of view of the terrain through the image combiner of the HUD, as is commonly understood.

Figure 2:
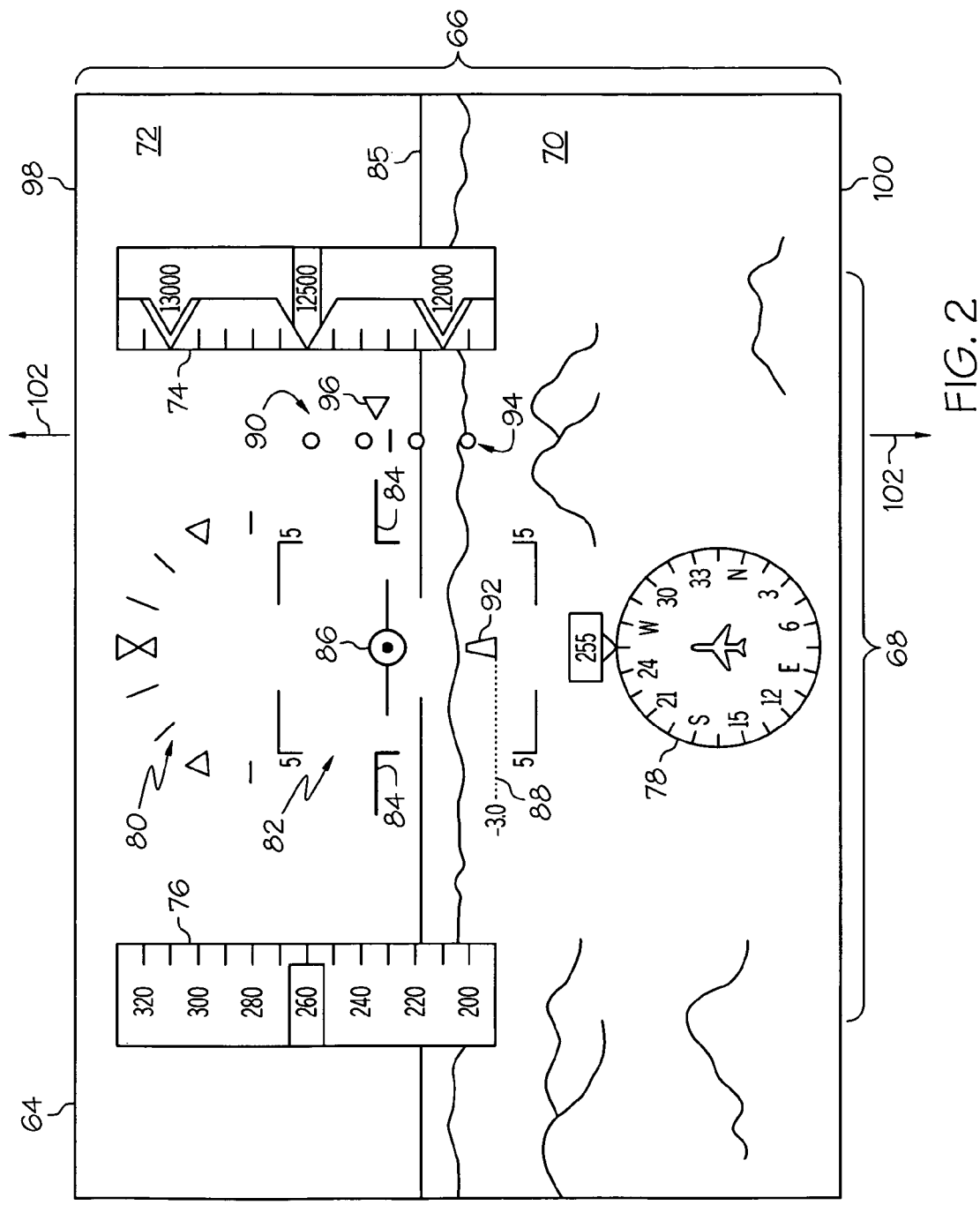
FIGS. 2 and 3 are a plan views of a display screen of a display device on-board the aircraft of FIG. 1, illustrating the operation thereof according to one embodiment of the present invention.

FIG. 2 illustrates a display screen 64 of display device 18 during operation, according to one embodiment of the present invention, as the aircraft 10 is in a first position over a portion of terrain (i.e., actual terrain). On the display screen 64 are shown a terrain image 66 and a symbology image (or simply "symbology") 68. The terrain image 66 is at least representative of the user's 28 view from the flight deck 12. In the exemplary embodiment shown in FIG. 2, the terrain image 66 depicts a perspective view from the aircraft 10 of the terrain outside the aircraft 10 and covers substantially the entire display screen 64. The terrain image 66 includes a terrain portion 70 and a sky portion 72. As is commonly understood, in an embodiment in which the display device in use is a head-down display, such as an LCD display, the terrain image 66 is generated based on multiple readings from various instruments onboard the aircraft 10 that provide a current position and/or orientation (e.g., heading) of the aircraft 10 and changes as the position and/or orientation of the aircraft 10 changes, as well as the terrain and navigational databases 50 and 52 (FIG. 1). As indicated on FIG. 2, terrain features (e.g., hills, mountains, valleys, etc.) may be shown on the terrain image 66 to assist the user 28 with the operation of the aircraft 10. In an embodiment in which the display screen 64 is an image combiner of a HUD, the terrain image 66 is simply the user's 28 view of the terrain (and/or the interior of the flight deck 12) as seen through the display screen 64.

Still referring to FIG. 2, the symbology 68 is displayed over terrain image 66. The symbology 68 includes multiple digital instruments that provide, among other things, an indication of a position and/or orientation (i.e., heading, pitch, roll, etc.) of the aircraft 10 to the user 28. In the depicted embodiment, the symbology 68 includes an altitude indicator 74, an airspeed indicator 76, a heading indicator 78, a roll indicator 80, and a pitch indicator 82. In the embodiment illustrated, the altitude indicator 74 and the airspeed indicator 76 are displayed as an altitude tape and an airspeed tape, respectively, as is commonly understood. The heading indicator 78 is graphically displayed as a compass at a lower center portion of the display screen 64. The roll indicator 80 is displayed above the heading indicator 78 at an upper portion of the display screen 64, and the pitch indicator 82 is positioned between the heading indicator 78 and the roll indicator 80. The pitch indicator 82 includes an aircraft pitch symbol 84 that indicates the direction in which a nose of the aircraft 10 is pointing, regardless of the actual direction of flight, as is commonly understood. The pitch indicator 82 may also be understood to include a horizon line (or a zero pitch reference line) 85. In the embodiment shown, in order to accurately represent the curved surface of the terrain (i.e., the planet), the horizon line 85 is positioned slightly above the boundary between the terrain portion 70 and the sky portion 72 of the terrain image 66. As such, the horizon line 85 may be considered to be part of either the terrain image 66 or the symbology image 68, or alternately part of neither.

In the embodiment shown, the symbology 68 also includes a flight path indicator 86, a flight path reference indicator 88, and a vertical position indicator 90. As is commonly understood, the flight path indicator 86 indicates the path of the flight of the aircraft 10 if the current operational state is maintained. In one embodiment, the flight path reference indicator 88 provides a desired navigation point and a desired angle to approach the navigation point, as measured from level flight. In the depicted embodiment, the desired navigation point refers to a point on a runway (or runway symbol) 92 (which may also be part of the symbology 68) that is displayed on the display screen 64, and the desired approach angle is −3.0 degrees. As such, the flight path reference indicator 88, in the depicted embodiment, may be understood as indicating a desired flight path (not specifically shown) as the aircraft 10 approaches the runway 92 for landing.

Still referring to FIG. 2, in the depicted embodiment, the vertical position indicator 90 includes a column 94 of two pairs of small circles on opposing sides of a dash and a needle 96 along a side of the column 94. The vertical position indicator 90 may be referred to as a Vertical Deviation Indicator (VDev) and the flight path reference indicator 88 may be referred to as a Flight Path Reference Line (FPRef), as are commonly understood. The vertical position indicator 90 indicates the vertical position of the aircraft 10 relative to the desired flight path by moving the needle 96 relative to the column 94. In one embodiment, the needle 96 being positioned above the dash within the column 94 is indicative of the aircraft 10 being below the desired flight path, and vice versa.

In accordance with one aspect of the present invention, the vertical position indicator 90 "vertically" moves on the display screen 64 in conjunction (or synchronization) with another indicator of the symbology 68. In particular, the vertical position indicator 90 moves between upper 98 and lower 100 edges of the display screen 64 in a pitch direction 102 (as indicated by the arrows pointing both towards and away from the upper edge 98). As will be appreciated by one skilled in the art, the pitch direction 102 corresponds to the movement of the terrain image 66 on the display screen 64 if (or only if) the pitch of the aircraft 10 is changed.

Figure 3:
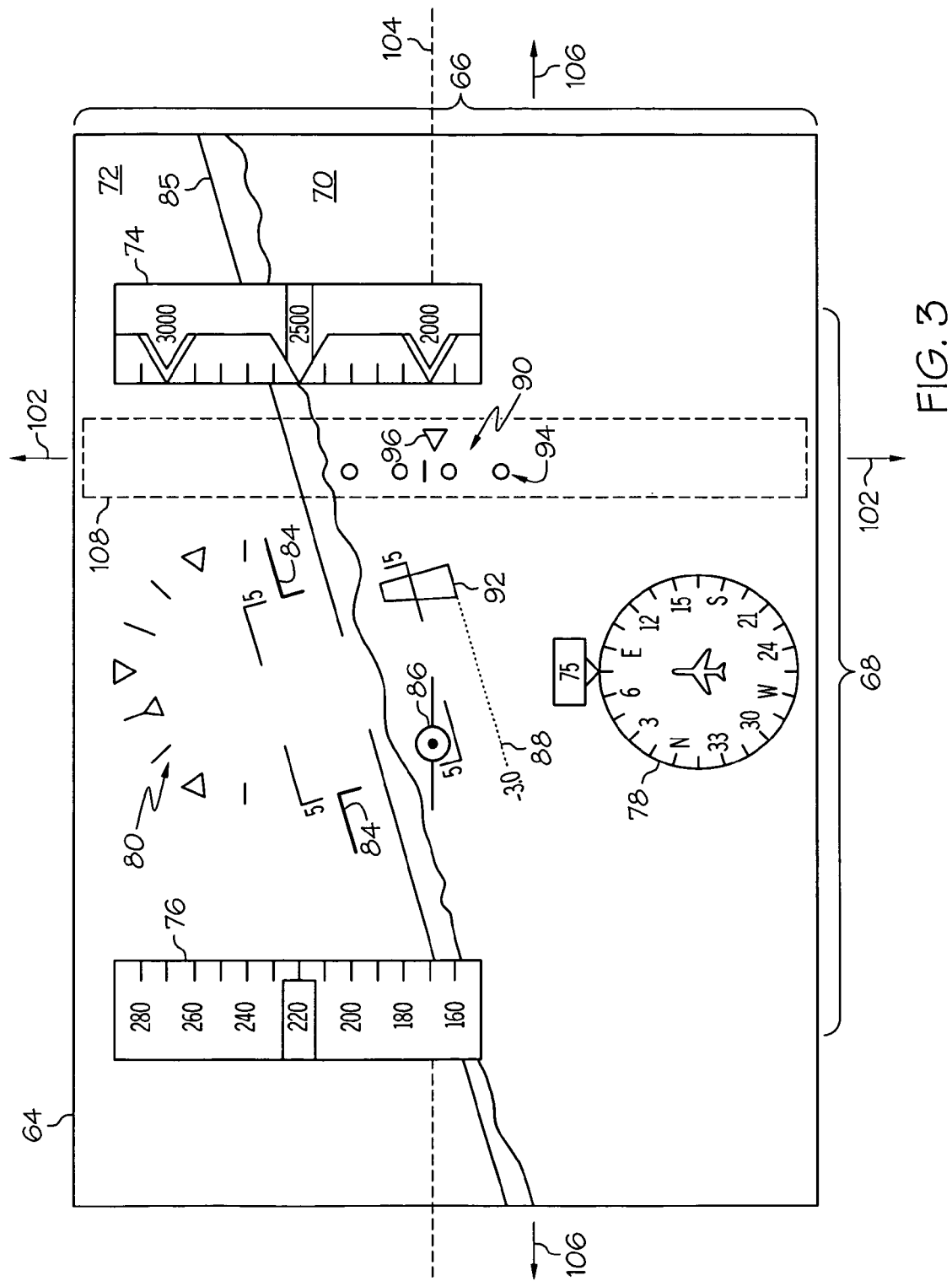

FIG. 3 illustrates the display screen 64 with the aircraft 10 in a second position over the portion of terrain. In the example shown in FIGS. 2 and 3, in the second position the aircraft 10 has flown closer to the runway 92 and is now at a lower altitude, as indicated by the altitude indicator 74. In the particular embodiment shown in FIGS. 2 and 3, the vertical position indicator 90 is vertically synchronized with the flight path indicator 86, which has moved towards the lower edge of the screen 64. As such, the vertical position indicator 90 has also moved down (i.e., in the pitch direction 102) at the same rate (or speed) as the flight path indicator 86 such that a line 104 that extends through the flight path indicator 86 in a yaw direction 106 also extends through the vertical position indicator 90 (in particular through the dash within the column 94). As will be appreciated by one skilled in the art, the yaw direction 106 corresponds to the movement of the terrain image 66 on the display screen 64 if (or only if) the yaw of the aircraft 10 is changed. Although not specifically shown, it is apparent that such a line would similarly extend through the flight path indicator 86 and the vertical position indicator 90 in FIG. 2.

It should also be noted that a comparison of FIGS. 2 and 3 indicates that the flight path indicator 86 has moved in the yaw direction 106, as well as the pitch direction 102. However, in the depicted embodiment, the vertical position indicator 90 has only moved in the pitch direction 102 and may thus be understood to be "vertically restricted" to movement within a column 108, which may not be visible to the user 28. That is, the vertical position indicator 90 is prevented from moving in the yaw direction 106 with the flight path indicator 86. Also note that the vertical position indicator 90 is restricted from rotating with the terrain image 66, as dictated by the shape of column 108. Therefore, not only is the overall position of the vertical position indicator 90 prevented from moving in the yaw direction 106 on the screen 64, but each individual portion of the vertical position indicator 90 is prevented from moving in the yaw direction 106. That is, the angular orientation of the vertical position indicator 90 is constant relative to the edges of the screen 64, which is perhaps most clearly seen in FIG. 3 by comparing the angular orientation of the column 94 of the vertical position indicator 90 to the horizon line 85. It should also be noted that in FIG. 3, the vertical position indicator 90 indicates that the aircraft 10 is slightly below the desired flight path, as the needle 96 of the vertical position indicator 90 is positioned below the dash within the column 94 of the vertical position indicator.

Although not shown, it should be understood that the vertical movement of the vertical position indicator 90 may be restricted within the column 108. For example, if the pitch of the aircraft 10 is decreased very rapidly, the flight path indicator 86 may approach (or even pass) the upper edge of the display screen 64. However, in one embodiment, the movement of the vertical position indicator 90 may be further restricted such that the dash within the column 94 of the vertical position indicator 90 does not move beyond the aircraft pitch symbol 84.

Figure 4:
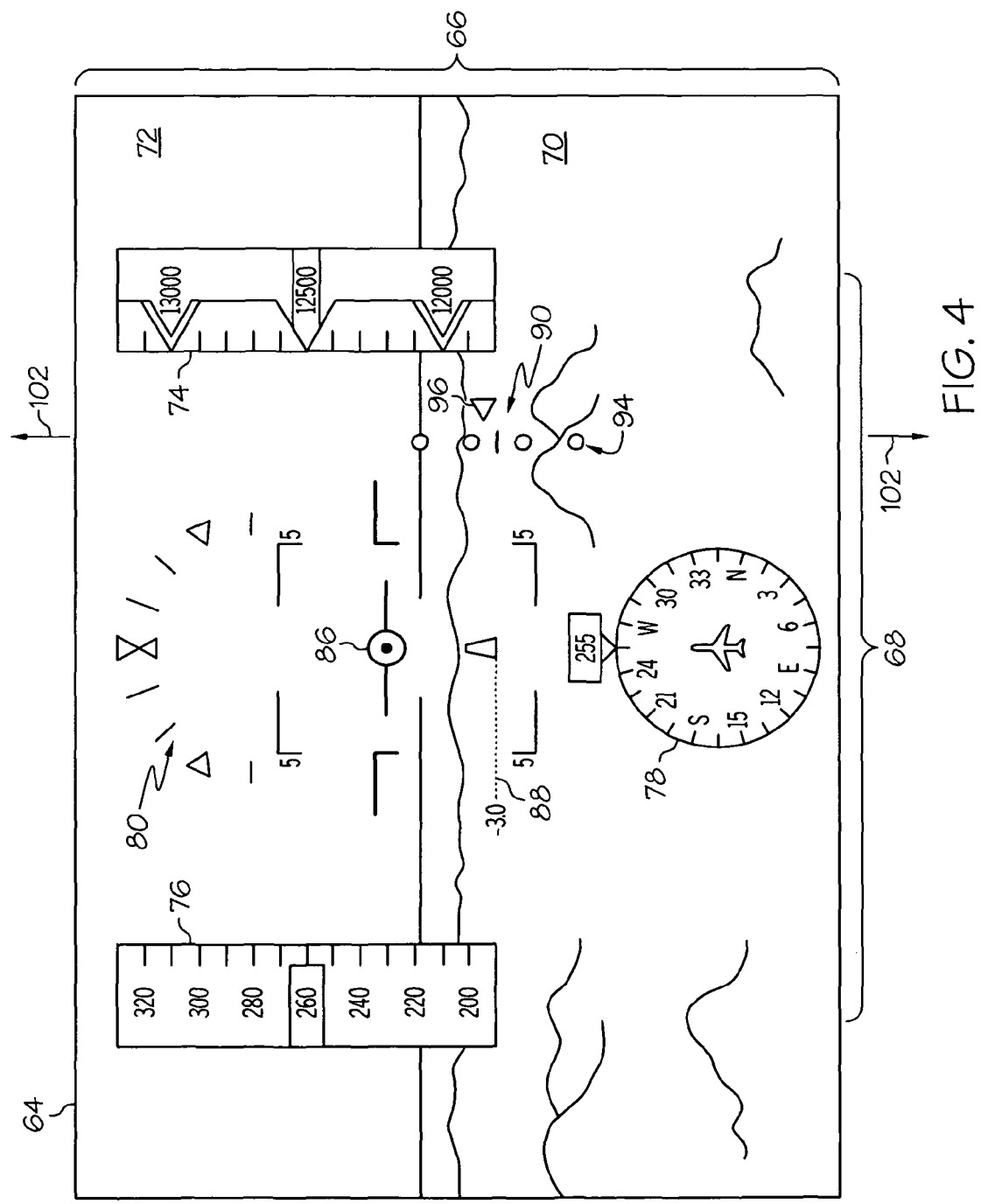
FIGS. 4 and 5 are a plan views of the display screen of FIGS. 2 and 3, illustrating the operation of the display device according to another embodiment of the present invention.
Figure 5:
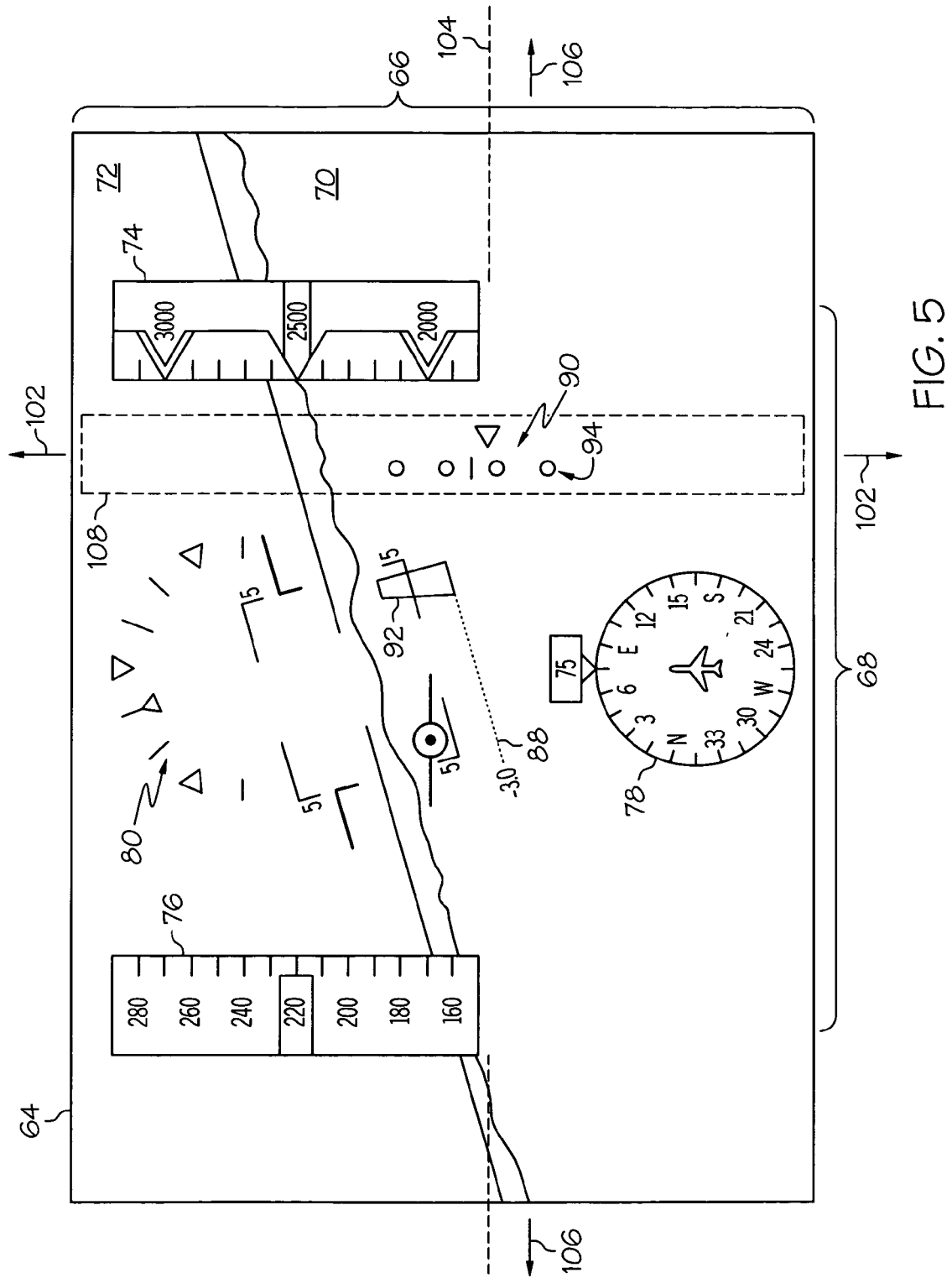

FIGS. 4 and 5 illustrate the display screen 64 during operation of the display device 18, according to another embodiment of the present invention, in which the vertical position indicator 90 is vertically synchronized with the flight path reference indicator 88. As shown in FIG. 4 (with the aircraft 10 in the first position over the terrain), the vertical position indicator 90 is vertically aligned with the flight path reference indicator 88. As the aircraft 10 moves into the second position over the terrain, as shown in FIG. 5, the vertical position indicator 90 has moved downwards (i.e., in the pitch direction 102) on the display screen 64, along with the flight path reference indicator 88. In the particular embodiment shown in FIGS. 4 and 5, the vertical position indicator 90 is vertically aligned with the flight path reference indicator 88 such that the line 104 extends through the dash within the column 94 of the vertical position indicator 90 and the right edge of the flight path reference indicator 88. It should again be noted that although the flight path reference indicator 88 has also moved in the yaw direction 106 and the roll of the aircraft 10 has been changed the vertical position indicator 90 has only moved in the pitch direction 102 and has maintained its angular orientation relative to the display screen 64.

Figure 6:
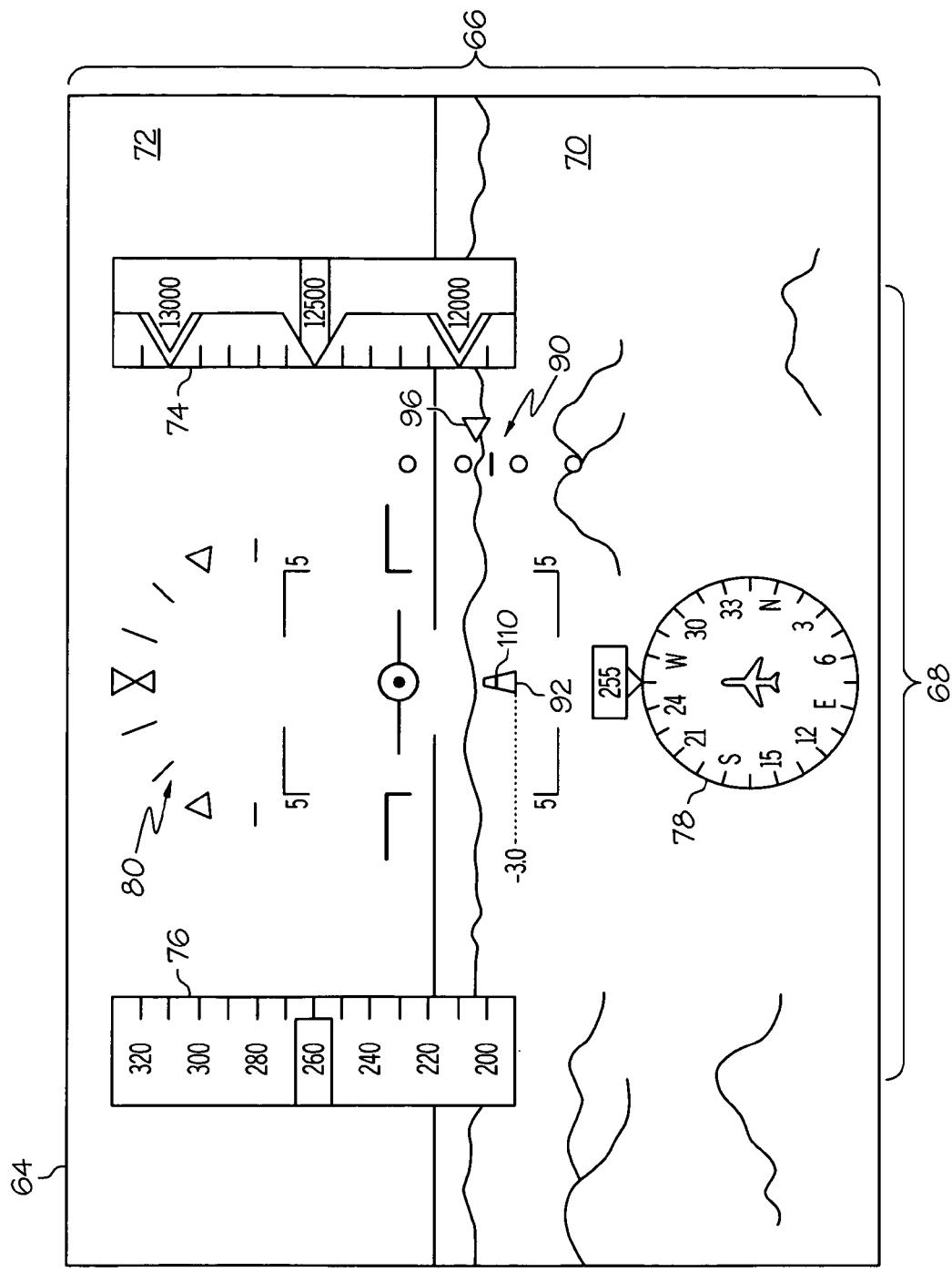
FIGS. 6 and 7 are a plan views of the display screen of FIGS. 2 and 3, illustrating the operation of the display device according to a further embodiment of the present invention.
Figure 7:
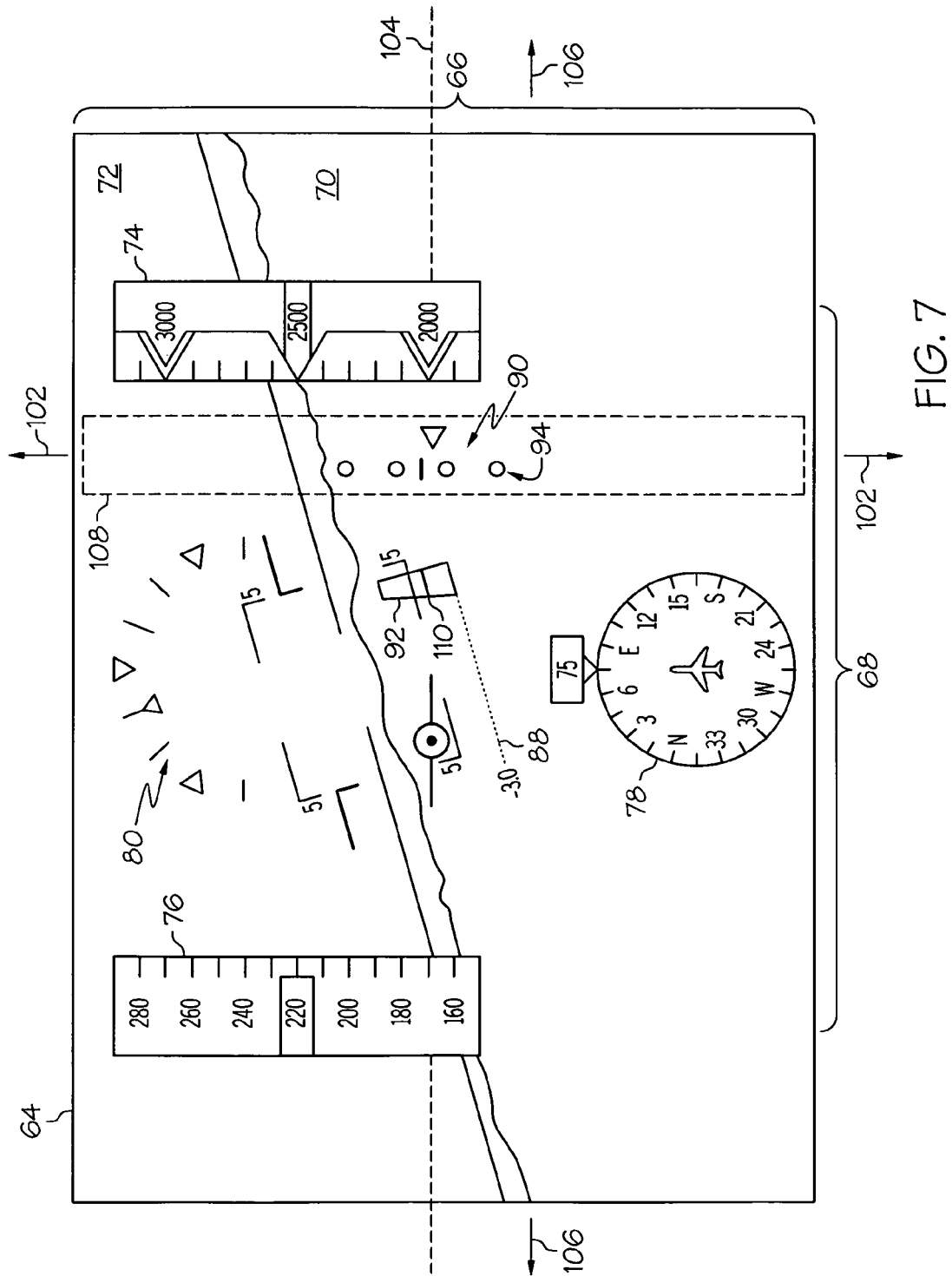

FIGS. 6 and 7 illustrate the display screen 64 during operation of the display device 18, according to further embodiment of the present invention, in which the vertical position indicator 90 is vertically synchronized with the runway 92. In particular, the vertical position indicator 90 is vertically synchronized with a central portion 110 of the runway 92. As shown in FIG. 6 (with the aircraft 10 in the first position over the terrain), the vertical position indicator 90 is vertically aligned with the central portion 110 of the runway symbol 92. As the aircraft 10 moves into the second position over the terrain, as shown in FIG. 7, the vertical position indicator 90 has slightly upwards (i.e., in the pitch direction 102) on the display screen 64, along with the runway symbol 92 such that the line 104 extends through the dash within the column 94 of the vertical position indicator 90 and the central portion 110 of the runway symbol 92. It should again be noted that although the runway 92 has also moved in the yaw direction 106 and the roll of the aircraft 10 has been changed the vertical position indicator 90 has only moved in the pitch direction 102 and has maintained its angular orientation relative to the display screen 64.

Figure 8:
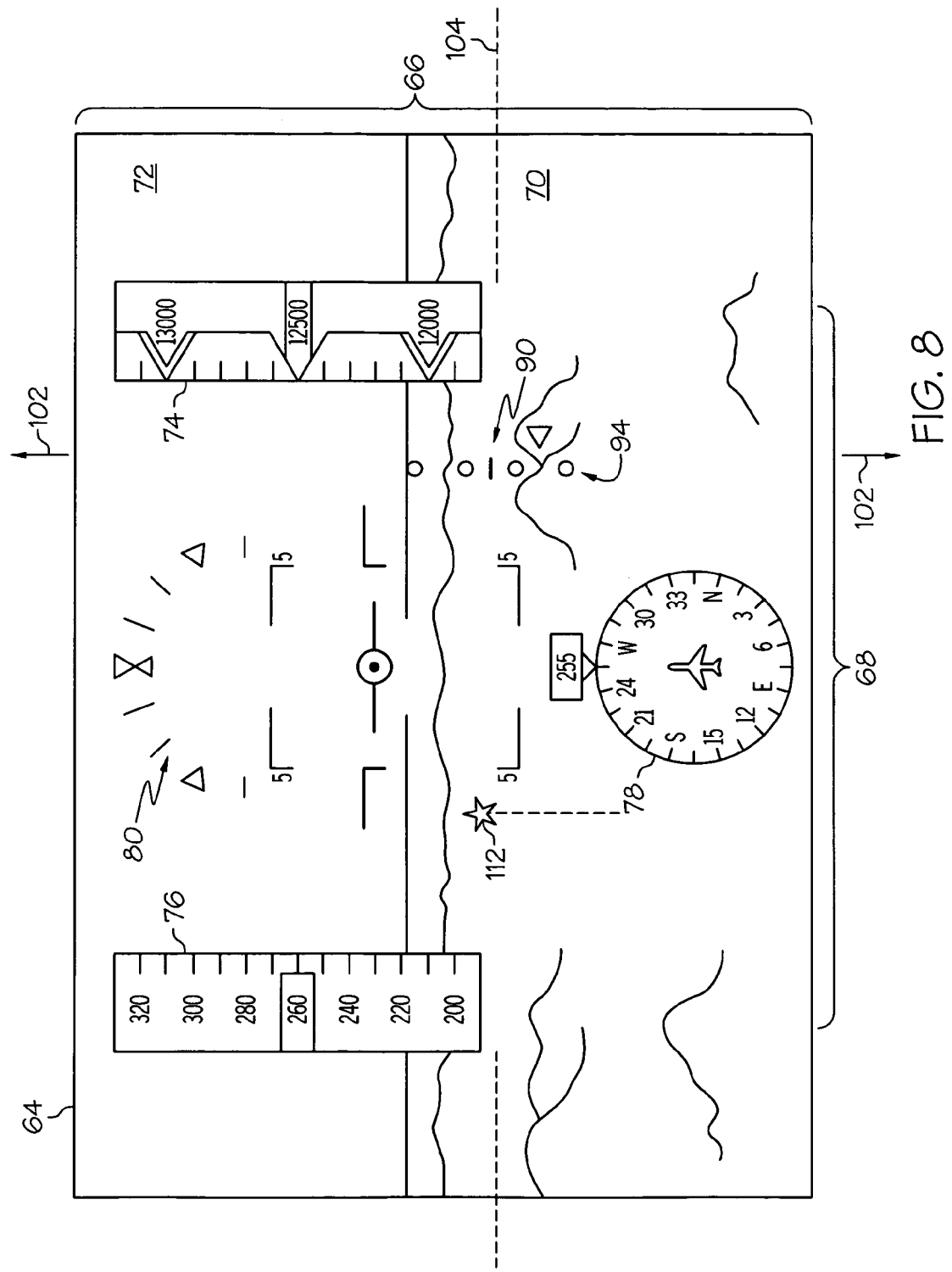
FIG. 8 is a plan view of the display screen of FIGS. 2 and 3, illustrating the operation of the display device according to a yet a further embodiment of the present invention.

FIG. 8 illustrates the display screen 64 during operation of the display device 18, according to a yet further embodiment of the present invention, in which the vertical position indicator 90 is vertically synchronized with a three-dimensional (3-D) waypoint 112. As shown, the 3-D waypoint 112 is displayed as a marker (e.g., a star) positioned above the terrain as represented by the terrain portion 70 of the terrain image 66. As in the previous embodiments, the line 104 extends through the dash within the column 94 of the vertical position indicator 90 and the waypoint 112. Although not specifically shown, as the terrain image 66 changes with the movement of the aircraft 10 over the actual terrain, the vertical position indicator 90 moves in (and only in) the pitch direction 102 on the display screen 64 in a manner synchronized with the waypoint 112, in a manner similar to that described above.

One advantage of the method and system described above is that because the vertical position indicator is vertically synchronized with an item on the display that is suitable for the user's focus (e.g., the flight path indicator), the amount that the user's vision must be diverted to see the vertical position indicator is minimized. As a result, the user may continually monitor the vertical position indicator more easily. Another advantage is that because the vertical position indicator only moves vertically on the display screen (i.e., in the pitch direction), the likelihood of the vertical position indicator becoming obscured by another item of the symbology, or vice versa, is greatly reduced.

Other embodiments may utilize the method and system described above on vehicles other than aircraft, such as land vehicles and watercraft. The method and system may also be used on unmanned vehicles, in which the operational range limit corresponds to station where a user remotely controls the vehicle. The symbology should also understood to not be limited to conventional symbology, and may also include such imagery as sensor images, synthetic images, library images, conformal images, or any other content.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for operating a display device that is viewable by a user of an aircraft comprising:
   generating a digital terrain image on the display device, the digital terrain image being representative of an actual terrain;
   displaying a symbology image over the digital terrain, the symbology image comprising a vertical position indicator indicating a vertical position of the aircraft relative to a selected flight path; and
   moving the vertical position indicator in a pitch direction on the display device in response to the aircraft moving relative to the actual terrain, the pitch direction corresponding to a change in the pitch of the aircraft.

2. The method of claim 1, wherein the symbology image further comprises a selected indicator and further comprising moving the selected indicator in the pitch direction on the display device in response to the aircraft moving relative to the actual terrain.

3. The method of claim 2, wherein the movement of the vertical position indicator in the pitch direction on the display device is proportional to the movement of the selected indicator in the pitch direction on the display device.

4. The method of claim 3, wherein a speed at which the vertical position indicator moves in the pitch direction on the display device is substantially equal to a speed at which the selected indicator moves in the pitch direction on the display device.

5. The method of claim 4, wherein a line extending in a yaw direction on the display device extends through a portion of the selected indicator and a portion of the vertical position indicator, the yaw direction corresponding to a change in the yaw of the aircraft.

6. The method of claim 5, further comprising moving the selected indicator in the yaw direction on the display device in response to the aircraft moving relative to the actual terrain and wherein the vertical position indicator is restricted to movement in substantially the pitch direction.

7. The method of claim 1, wherein the vertical position indicator is a Vertical Deviation Indicator (VDev).

8. The method of claim 7, wherein the digital terrain image is at least representative of a field of view from on-board the aircraft.

9. A method for operating a display device that is viewable by a user of an aircraft comprising:
   causing a first image to be displayed on the display device, the first image being at least representative of a field of view from on-board the aircraft of an actual terrain;
   rendering a second image over the first image on the display device, the second image comprising a vertical position indicator indicating a vertical position of the aircraft relative to a selected flight path; and
   moving the vertical position indicator in a pitch direction on the display device in response to the aircraft moving relative to the actual terrain, the pitch direction corresponding to a change in the pitch of the aircraft,
wherein the vertical position indicator is restricted to movement in substantially the pitch direction on the display device.

10. The method of claim 9, wherein the vertical position indicator is a Vertical Deviation Indicator (VDev).

11. The method of claim 9, wherein the second image further comprises a selected indicator and further comprising moving the selected indicator in the pitch direction on the display device in response to the aircraft moving relative to the actual terrain, wherein a speed at which the vertical position indicator moves in the pitch direction on the display device is substantially equal to a speed at which the selected indicator moves in the pitch direction on the display device.

12. The method of claim 11, wherein a line extending in a yaw direction on the display device extends through a portion of the selected indicator and a portion of the vertical position indicator, the yaw direction corresponding to a change in the yaw of the aircraft.

13. The method of claim 12, further comprising moving the selected indicator in the yaw direction on the display device in response to the aircraft moving relative to the actual terrain.

14. The method of claim 13, wherein the display device is a head-up display (HUD) device and the first image is an actual image of the actual terrain as viewed by the user through the HUD device.

15. The method of claim 13, wherein the first image is a digital terrain image that is representative of the view from on-board the aircraft of the actual terrain.

16. An avionics system comprising:
   a display device that is viewable by a user of an aircraft;
   a processor in operable communication with the display device, the processor being configured to:
      display a digital terrain image on the display device, the digital terrain image being representative of an actual terrain;
      display a symbology image over the digital terrain, the symbology image comprising a vertical position indicator indicating a vertical position of the aircraft relative to a selected flight path to the user of the aircraft; and
      move the vertical position indicator on the display device in a pitch direction in response to the aircraft moving relative to the actual terrain, the pitch direction corresponding to a change in the pitch of the aircraft.

17. The avionics system of claim 16, wherein the vertical position indicator is restricted to movement in substantially the pitch direction and the vertical position indicator is a Vertical Deviation Indicator (VDev).

18. The avionics system of claim 17, wherein the symbology image further comprises a selected indicator and the processor is further configured to move the selected indicator in the pitch direction on the display device in response to the aircraft moving relative to the actual terrain.

19. The avionics system of claim 18, wherein a line extending in a yaw direction on the display device extends through a portion of the selected indicator and a portion of the vertical position indicator, the yaw direction corresponding to a change in the yaw of the aircraft, and a speed at which the vertical position indicator moves in the pitch direction on the display device is substantially equal to a speed at which the selected indicator moves in the pitch direction on the display device.

20. The avionics system of claim 19, further comprising moving the selected indicator in the yaw direction on the display device in response to the aircraft moving relative to the actual terrain and wherein the vertical position indicator is restricted to movement in substantially the pitch direction.

* * * * *